(12) United States Patent
Jiang et al.

(10) Patent No.: US 8,451,969 B2
(45) Date of Patent: May 28, 2013

(54) APPARATUS, SYSTEM, AND METHOD FOR TIMING RECOVERY

(75) Inventors: Yueming Jiang, Rancho Cordova, CA (US); Ravindran Mohanavelu, Mountain View, CA (US); Michael W. Altmann, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 13/048,227

(22) Filed: Mar. 15, 2011

(65) Prior Publication Data

US 2012/0235720 A1    Sep. 20, 2012

(51) Int. Cl.
*H04L 7/00* (2006.01)
(52) U.S. Cl.
USPC .......... 375/355; 375/354; 375/316; 375/295; 375/219; 375/371; 327/155; 327/156; 327/158; 327/159
(58) Field of Classification Search
USPC .. 375/355, 354, 316, 295, 219, 371; 327/155, 327/156, 158, 159
See application file for complete search history.

(56) References Cited

U.S. PATENT DOCUMENTS

| 7,681,091 | B2 | 3/2010 | Hafed |
| 7,721,036 | B2 | 5/2010 | Poplack et al. |
| 7,747,890 | B2 | 6/2010 | Lee |
| 2008/0297213 | A1* | 12/2008 | Abbasfar et al. ............. 327/156 |
| 2010/0142610 | A1* | 6/2010 | Stojanovic et al. ........... 375/232 |

FOREIGN PATENT DOCUMENTS

KR    20070026498    3/2007

OTHER PUBLICATIONS

First Office Action mailed Jul. 25, 2012 for Chinese Utility Model Patent Application No. 2012 20093833.3.
International Search Report and Written Opinion for PCT Patent Application No. PCT/US20112/025313, Mailed Sep. 27, 2012, 10 pages.
Notice of Allowance for Taiwan Patent Application No. 101204199. Mailed Dec. 10, 2012. 8 pages.

* cited by examiner

*Primary Examiner* — Zewdu Kassa
(74) *Attorney, Agent, or Firm* — Blakely, Sokoloff, Taylor & Zafman LLP

(57) ABSTRACT

Described herein are an apparatus, system and method for timing recovery in processors by means of a simplified receiver architecture that consumes less power consumption, has lower bit error rate (BER), and higher jitter tolerance. The apparatus comprises a phase interpolator to generate a clock signal; a first integrator to integrate a first portion of a data signal over a duration of a phase of the clock signal; a first sampler to sample the first integrated portion by means of the clock signal; a first circuit to store a first edge sample of the data signal; a second sampler to sample the stored first edge sample by means of the clock signal; and a clock data recovery unit to update the phase interpolator based at least on the sampled first integrated portion and sampled stored first edge sample of the data signal.

20 Claims, 8 Drawing Sheets

APPARATUS, SYSTEM, AND METHOD FOR TIMING RECOVERY

FIELD OF THE INVENTION

Embodiments of the invention relate generally to the field of processors. More specifically, embodiments of the invention relate to an apparatus, system and method for timing recovery to process data signals in processors.

BACKGROUND

In a typical input-output (I/O) transceiver, a receiver of a processor processes a received signal to ascertain the data contained in the received signal. Such processing requires determining data and edge samples for the received signal by means of at least two phase interpolators (PIs), each phase interpolator (PI) generating a pair of clock signals. The output of the PIs is quadrature clock signals having four phases. Two of the four phases are used to sample the received data signal while the remaining two of the four phases of the quadrature clock signals are used to sample edges of the received data signal. The term "edge" herein refers to the point in time when the data signal transitions from a logical low or a logical high signal level to a logical high or a logical low signal level, respectively. Any mismatch in the delay between the four phases of the quadrature clock signals causes an effective offset in the data sampling phase resulting in increase of bit error rate (BER) and reduction in jitter tolerance for the receiver.

A typical receiver 200 is shown in FIG. 2. The receiver 200 receives input signals rxp and rxn from a transmitter e.g., 103 of FIG. 1. The received signals rxp and rxn are sampled by samplers after being equalized by optional an equalizer. The samplers receive the four phased quadrature clock signals i.e., iclk, iclkb, qclk, qclkb from a clock distribution network that distributes the quadrature clock signal from the two PIs to the samplers. The output of the samplers are data and edge samples (d0, d1 and e0, e1) which are then utilized by a clock and data recovery (CDR) circuit to generate two sets of codes (pidac1 and pidac2) to instruct the two PIs to adjust delays to the quadrature clock signals. In the CDR circuit, the delays of the quadrature clock signals are adjusted so that the iclk signal samples the data signal at the middle of the data signal eye and the qclk signal samples the edge of the data signal at the transition point of the data signal. The four phased quadrature clock signals are generated by the two PIs that receive clock signals as inputs by means of a clock distribution network. Timing mismatch between the input clock signals cki, ckib, ckq, and ckqb, which are input to the two PIs, and the four phased output quadrature clock signals iclk, iclkb, qclk, and qclkb causes an offset in the data sampling phase, thus increasing BER and decreasing jitter tolerance for the receiver.

Such timing mismatch between the input and output clock signals may be caused by systematic and random process variations in the devices used to implement the two PIs—causing a mismatch in electrical behavior (e.g., delays, rise/fall times, etc) in the two PIs even when they have identical designs. Such timing mismatch between the input (cki, ckib, ckq, and ckqb) and output clock signals (iclk, iclkb, qclk, and qclkb) may also be caused, in addition to the mismatch in the two PIs, by routing delay mismatches in the clock distribution network between the four phased quadrature clock signals iclk, iclkb, qclk, and qclkb. Such mismatch between the four phased quadrature clock signals iclk, iclkb, qclk, and qclkb is a performance limiter (performance as measured by BER, timing margin, jitter tolerance, etc.) for receivers in a processor.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 2:
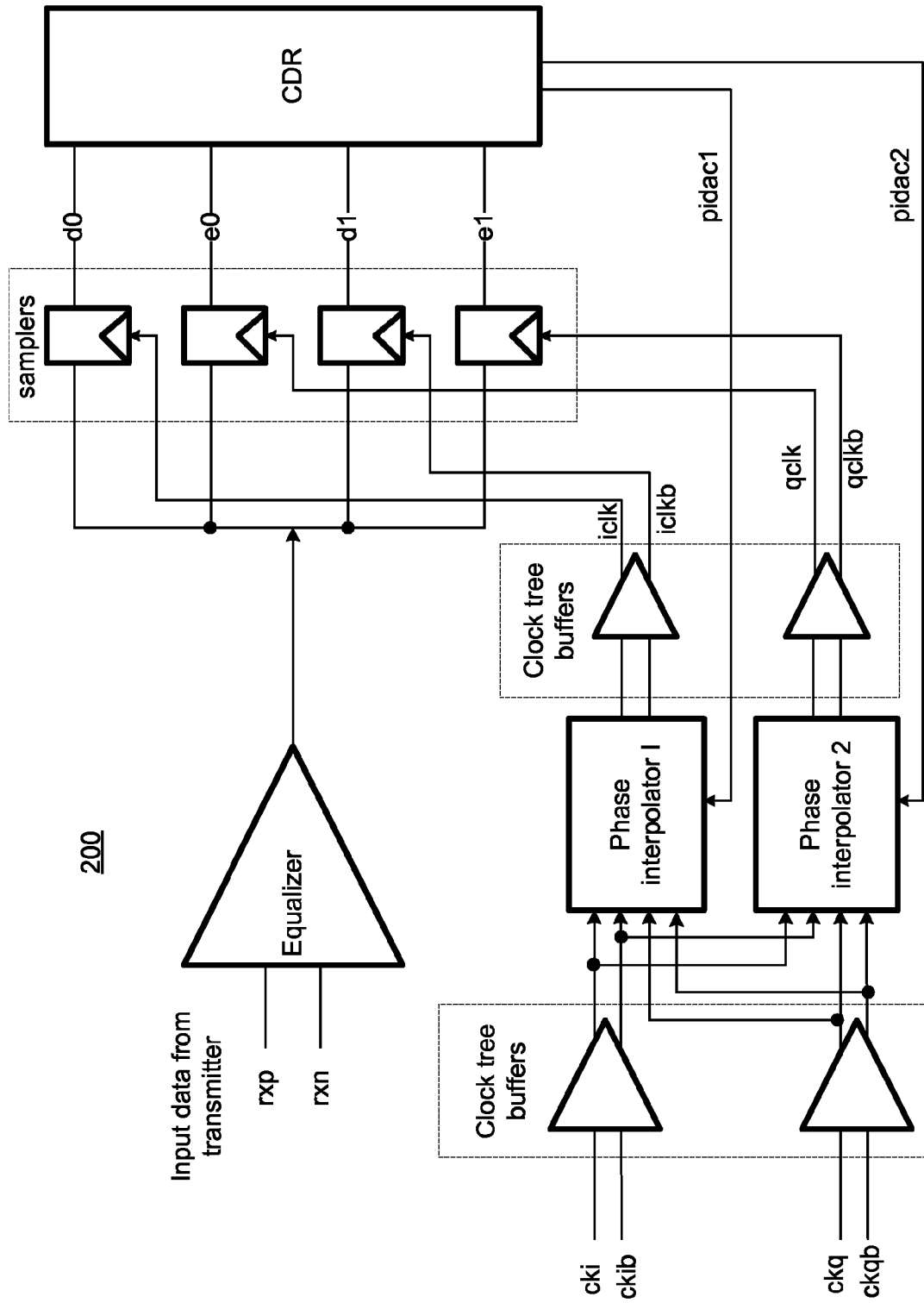
FIG. 2 is a traditional clock data recovery circuit with two or more phase interpolators and a complex clock signal distribution.

Embodiments of the invention relate to an apparatus, system and method for timing recovery in processors by means of a simplified receiver architecture that, compared to the receiver architecture of FIG. 2, consumes less power consumption, has lower bit error rate (BER), and higher jitter tolerance.

In one embodiment, a single phase interpolator (PI) is used instead of the two phase interpolators (PIs) of FIG. 2. In one embodiment, the PI is operable to generate two phases of a clock signal instead of the four phased quadrature clock signals of FIG. 2. In the embodiments described herein, the sources of mismatch in the two phases of the clock signal are eliminated because there is no additional clock signal to match against. Any mismatch in the input clock signals (input to the PI) does not cause mismatch in the output clock signals of the PI, but affect the linearity of the phase steps of the PI output.

In one embodiment, integrators are used prior to sampling of data signals. In such an embodiment, the integrators allow the receiver to apply a single clock edge to sample both the data and edge samples of the received data signal. A single sampling clock edge for sampling data and edge samples of the data signal eliminates the issues related to clock mismatches discussed with reference to FIG. 2. Hence, the receiver design is simplified resulting in minimum sources of mismatch in the two phases of the clock signal and thus a higher jitter tolerance and lower BER. In one embodiment, the use of a single PI to generate the clock signals results in less power consumption and a simplified clock data recovery (CDR) circuit over the receiver architecture of FIG. 2 that requires two PIs and a complex CDR to provide at least two control signals to the two PIs.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction any may be implemented with any suitable type of signal scheme, e.g., differential pair, single-ended, etc.).

Figure 1:
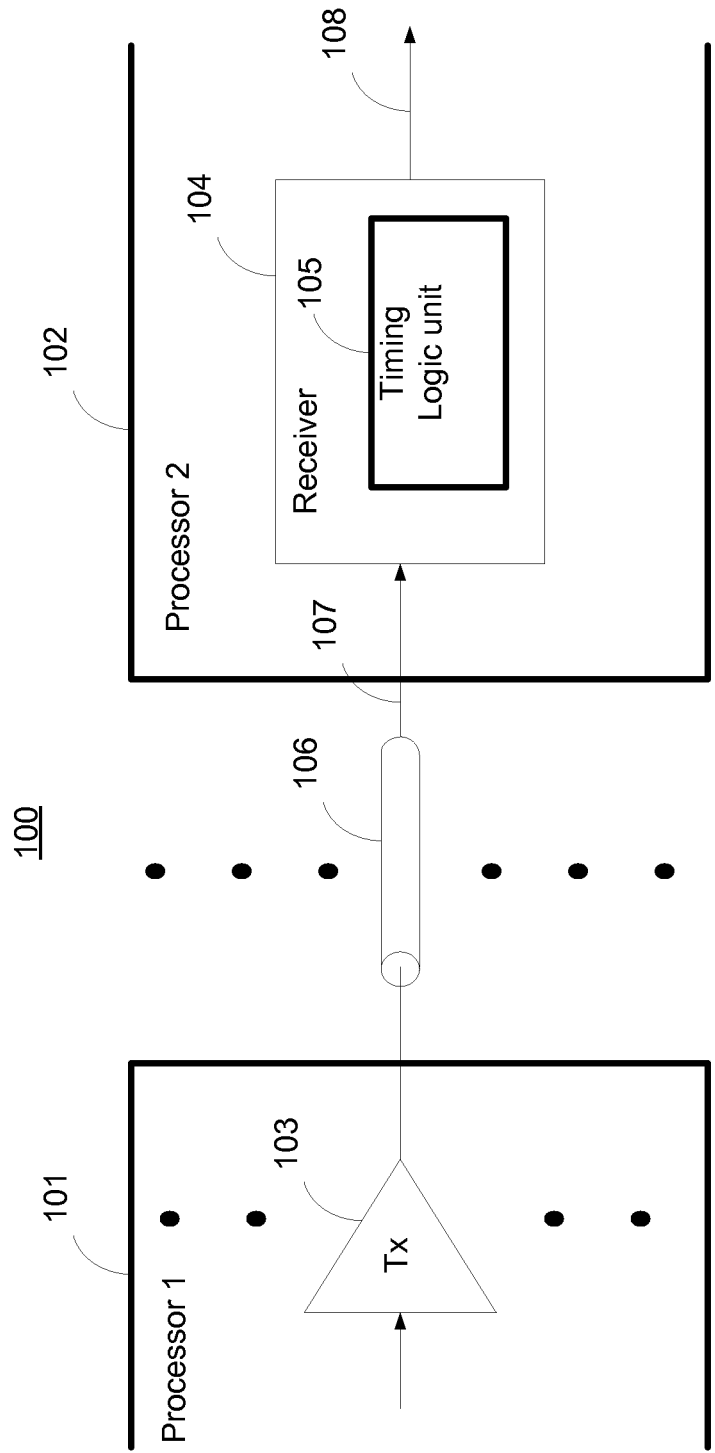
FIG. 1 illustrates a high level system having a receiver with a timing circuit, according to one embodiment of the invention.

FIG. 1 illustrates a high level system 100 having a receiver 104 with a timing circuit 105, according to one embodiment of the invention. In one embodiment, the system 100 comprises a processor 101 which is communicatively coupled to a processor 102 via a communication link 106. In one embodiment, the communication link 106 is a conductive trace on a motherboard (not shown). In another embodiment, the communication link 106 is a flexible conductive cable to interface with a Universal Serial Bus (USB). In one embodiment, the transmitter 103 and the receiver 104 (also called receiving unit) are a USB based transmitter and receiver units. In one embodiment, the USB based transmitter and receiver is a USB3 based transmitter and receiver. In other embodiments, the transmitter 103 and the receiver 104 correspond to other I/O standards such as Serial Advanced Technology Attachment (SATA), Peripheral Component Interconnect Express (PCI-E), etc.

Figure 6:
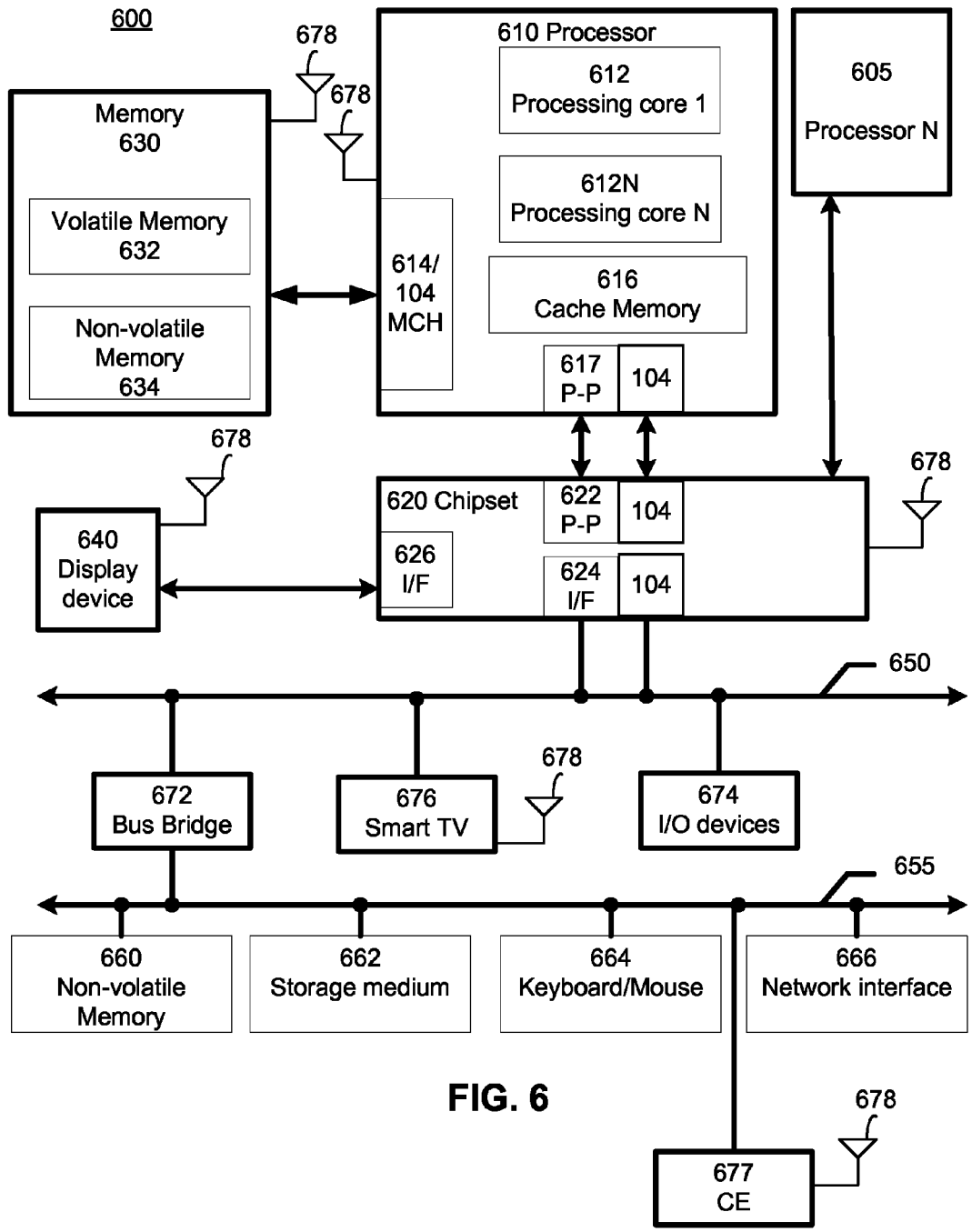
FIG. 6 is a system level diagram having instructions to execute the method of FIG. 5 and having the receiver of FIG. 1 and FIG. 3A, according to one embodiment of the invention.

In one embodiment, the communication link 106 is a wireless transmission medium as shown by the wireless antennas 678 of FIG. 6. In one embodiment, the wireless transmission medium is coupled to one or more of a wireless personal area network (WPAN), a wireless local area network (WLAN), and a wireless wide area network (WWAN).

Referring back to FIG. 1, in one embodiment the processors 101 and 102 are a microprocessor and a corresponding chipset processor respectively. In one embodiment, the processors 101 and 102 are both microprocessors (CPUs). In one embodiment, the processor 102 is coupled to a memory (Memories 630, 660, 662 of FIG. 6). In one embodiment, the memory is a Dynamic Random Access Memory (DRAM). In one embodiment, the memory is a Static Random Access Memory (SRAM). Referring back to FIG. 1, while the processor 102 is shown to have a receiver 104 and the processor 101 is shown to have a transmitter 103, in one embodiment, both processors 101 and 102 have transmitters and receivers on the same die to send and receive data over one or more communication links.

In one embodiment, the receiver 104 includes a logic unit 105 that is operable to process the received signal 107 such that the logic unit 105 has increased jitter tolerance and reduced BER. In one embodiment, the receiver 104 uses a single PI in its timing logic unit 105 to generate sampling clocks to sample data and edge samples of the received data signal 107. In one embodiment, the same sampling clock signal transition is used to sample both the data and edge samples of the received data signal 107. Details of the timing logic unit 105 are discussed with reference to FIGS. 3-6. The output signal 108 from the receiver 104 is used for further processing (not shown) by the processor 102.

Figure 3A:
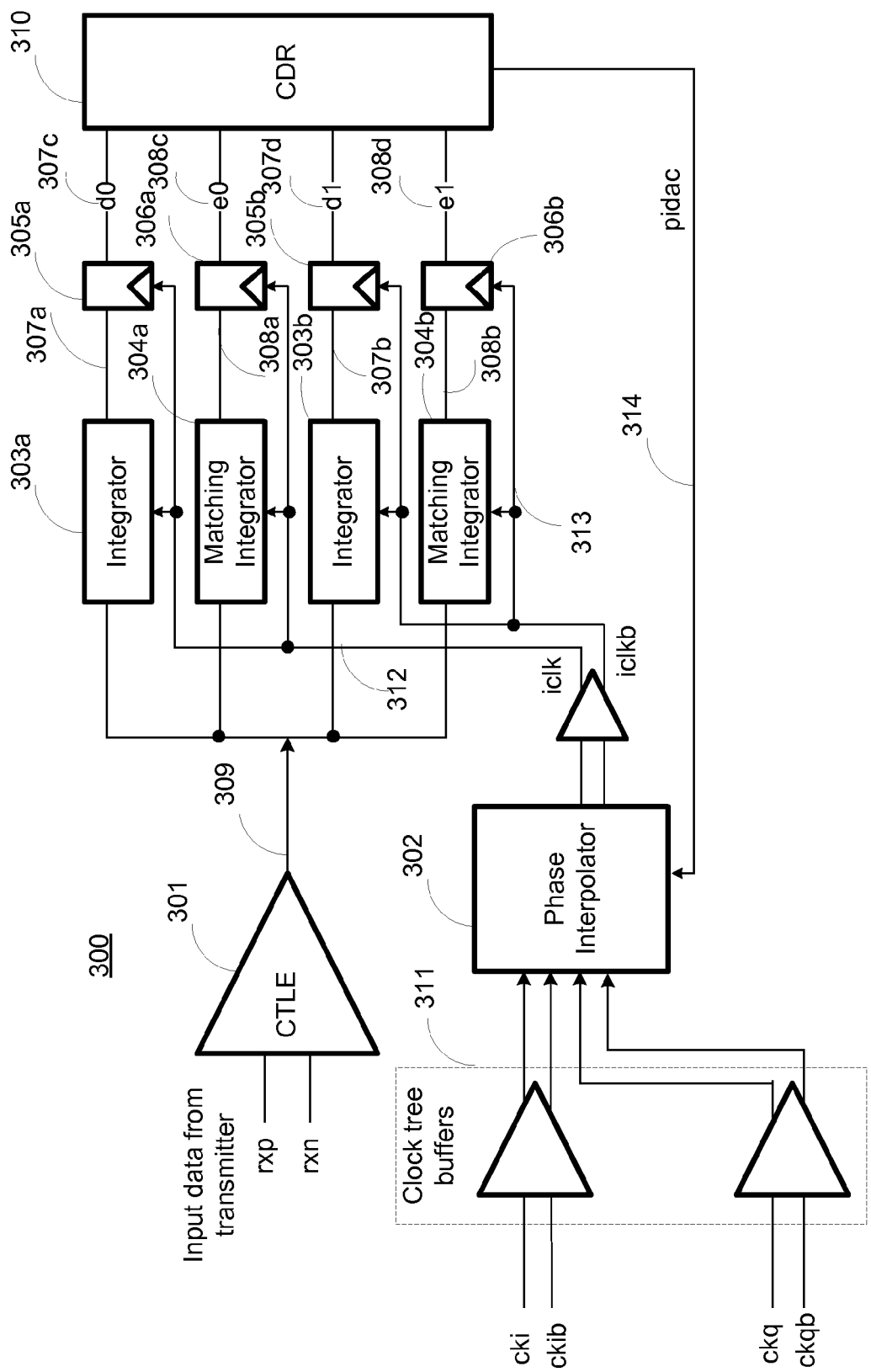
FIG. 3A is a receiver with a single phase interpolator and a simplified clock signal distribution network, according to one embodiment of the invention.

FIG. 3A is part of a receiver 300 (same as receiver 104 of FIG. 1) with a single PI and with a simplified clock signal distribution network over the receiver architecture of FIG. 2, according to one embodiment of the invention. In one embodiment, the receiver 300 comprises an equalizer 301 to equalize input signals received from a transmitter e.g., transmitter 103 of FIG. 1. In one embodiment, the equalizer 301 is a linear equalizer such as a Continuous Time Linear Equalizer (CTLE). In one embodiment, the equalizer 301 is operable to receive differential input signals rxp and rxn and outputs a single ended equalized signal 309. In other embodiments, the receiver 300 is operable to receive a single-ended signal from a transmitter (e.g., transmitter 103 of FIG. 1) without changing the essence of the embodiments of the invention.

In one embodiment, the receiver 300 comprises a single PI 302 which is operable to receive input clock signals cki, ckib, ckq, and ckqb by means of a clock tree, represented by clock buffers 311, to generate two clock signals iclk 312 and iclkb 313. In one embodiment, the input clock signals cki, ckib, ckq, and ckqb are quadrature clock signals. In one embodiment, the PI 302 is operable to generate only iclk 312 and its inverse signal iclkb 313 from the quadrature input clock signals. The input clock signals cki and ckib, like signals ckq and ckqb, are inverse of one another i.e., cki is inverse of ckib and ckq is inverse of ckqb, where clock signals cki and ckq are phase shifted relative to one another by 90 degrees. In one embodiment, the input clock signals cki, ckib, ckq, and ckqb are generated by a phase locked loop (PLL) which is not shown so as not to obscure the embodiments of the invention.

In one embodiment, the PI 302 is operable to receive a control/update signal 314 from a clock data recovery (CDR) unit 310. In one embodiment, the CDR 310 instructs the PI 302 to delay or modify its output signal iclk 312 relative to clock signal cki and/or ckq so that the data signal 309 is properly sampled by samplers 305a-b and 306a-b.

Figure 4A:
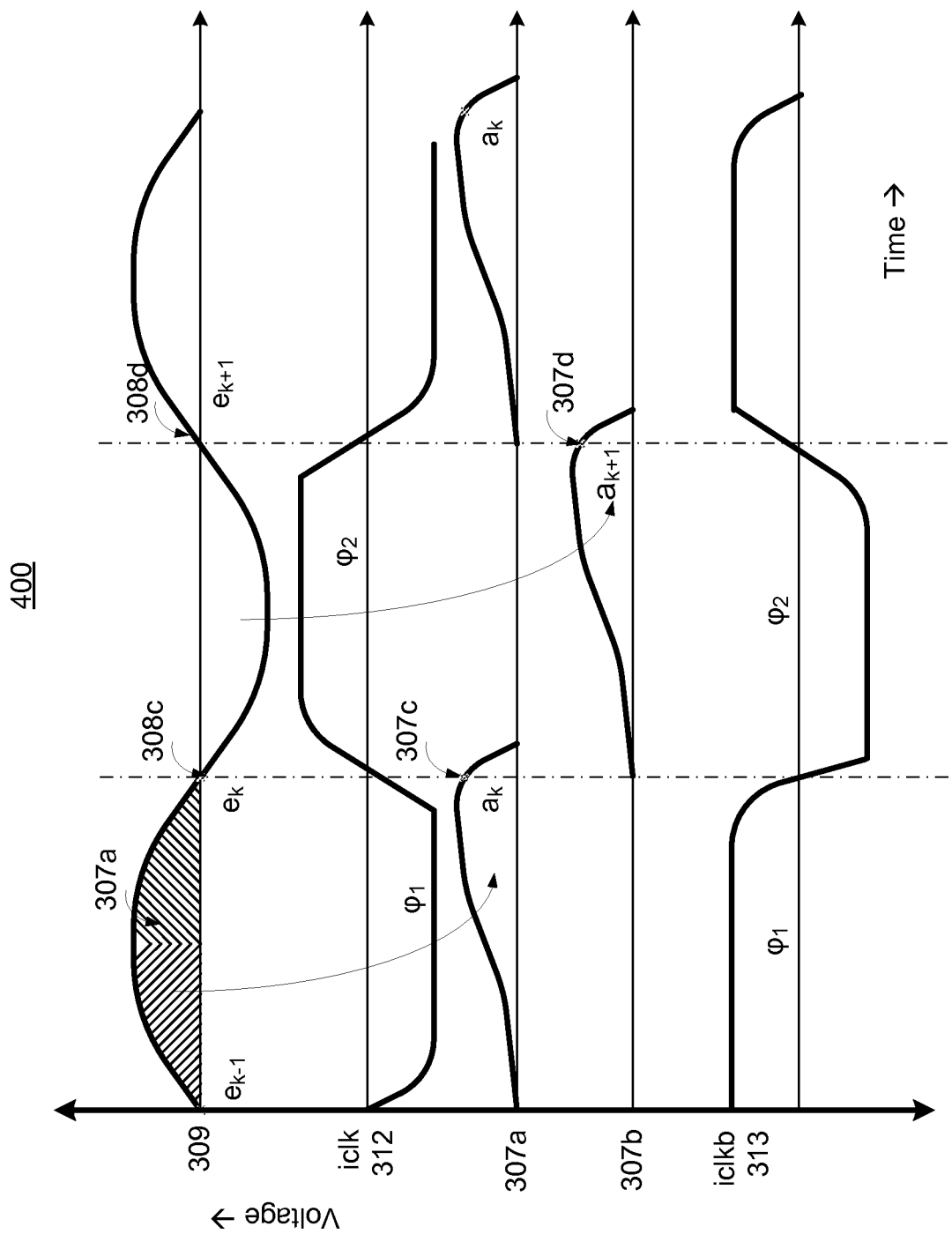
FIG. 4A is a timing diagram of the receiver of FIG. 3A, according to one embodiment of the invention.
Figure 4B:
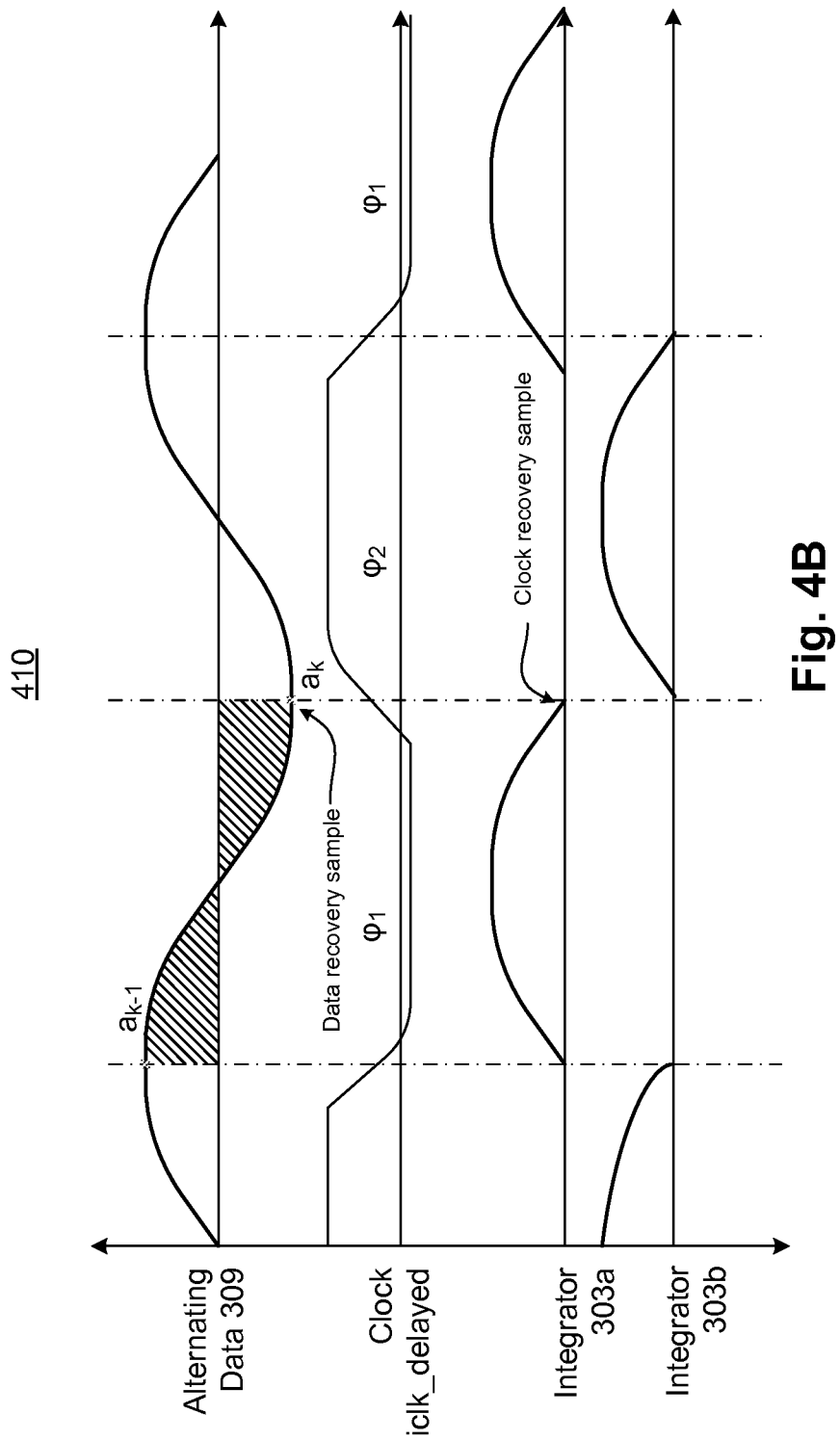
FIG. 4B is a timing diagram of an alternative receiver design, according to one embodiment of the invention.

The term "properly sample," with reference to FIG. 4A, refers to sampling the data signal 309 instantaneously to generate an edge sample of the data signal 309 while sampling the data signal after integrating the data signal over a phase of the data signal (the phase beginning from the data transition point) to generate a data sample of the data signal. In an alternative embodiment as shown in FIG. 4B, the term "properly sample" refers to instantaneously sampling the data signal in the middle of the eye of the data signal to generate a data sample of the data signal while sampling the integrated data signal, integrated over a phase of the data signal that begins from the middle of the data signal, to generate an edge sample of the data signal 309.

Referring back to FIG. 3A, in one embodiment, the data signal 309 is integrated over a time period of a phase of the data signal 309 prior to being sampled by the samplers 305a-b. In one embodiment, the first half of the data signal 309 (i.e., the first phase of the data signal 309) is integrated by an integrator 303a (also called the first integrator). In one embodiment, the second half of the data signal 309 (i.e., the second phase of the data signal 309) is integrated by integrator 303b (also called the second integrator). In one embodiment, the outputs 307a and 307b of the integrators 303a and 303b are sampled by samplers 305a (also called the first sampler) and 305b (also called the third sampler) respectively to generate data samples d0 307c and d1 307d.

In one embodiment, a first edge 308a of the data signal 309 is sampled instantaneously by sampler 306a (also called the second sampler) to generate a sample signal e0 308c, where the first edge of the data signal 309 corresponds to an edge of the first half of the data signal 309. In one embodiment, a second edge 308b of the data signal 309 is sampled instantaneously by sampler 306b (also called the fourth sampler) to generate a sample signal e1 308d, where the second edge e1 308d of the data signal 309 corresponds to an edge of the second half of the data signal 309. In one embodiment, matching integrators 304a (also called a first circuit) and 304b (also called a second circuit) are used prior to sampling the first and second edges of the data signal 309, where the matching integrators 304a and 304b are operable to match a delay of the integrators 303a and 303b respectively and to allow the samplers 306a and 306b to sample the data signal 309 instantaneously.

The term "match a delay" herein refers to adjusting a delay of a circuit (e.g., matching integrator 304a) so that the delay of that circuit is substantially equal to the delay of another circuit (e.g., the integrator 303a). The term "substantially equal" herein refers to the two quantities (e.g., delay in picoseconds) being within 10% of one another.

In one embodiment, the samplers 305a, 305b, 306a, and 306b are implemented as flip-flops. In another embodiment, the samplers 305a, 305b, 306a, and 306b are implemented as sample and hold circuits. In other embodiments, other kinds of samplers may be used for sampling the data signal at data and edge signal points without changing the essence of the embodiments of the invention.

In the embodiments discussed herein, the data and edge sampling by samplers 305a and 306a is performed by the same transitioning edge of the clock signal iclk 312. Similarly, the data and edge sampling by samplers 305b and 306b is performed by the same transitioning edge of the inverse of clock signal iclk 312 i.e., clock signal iclkb 313. By performing the data and edge sampling on the same transition of the clock signal, there is no need to have an additional PI as in the case of FIG. 2 to generate four phased quadrature clock signals. In such an embodiment, the BER reduces while the jitter tolerance of the receiver 300 increases because the sources of mismatch between the clock signals iclk 312 and iclkb 313 are reduced. In the above embodiments, the elimination of a PI also reduces power consumption and silicon area of the receiver 300.

In one embodiment, the CDR unit 310 is simplified over the CDR unit of FIG. 2 because the CDR unit 310 is operable to generate only one control (update) signal 314 to adjust or update the phases of the clock signals iclk 312 and iclkb 313 based on the data and edge samples 307c-d and 308c-d respectively. The term "adjust" or "update" herein refers to effectively changing or modifying the delays of the clock signals iclk 312 and iclkb 313 relative to the input clock signals cki and ckq.

Figure 3B:
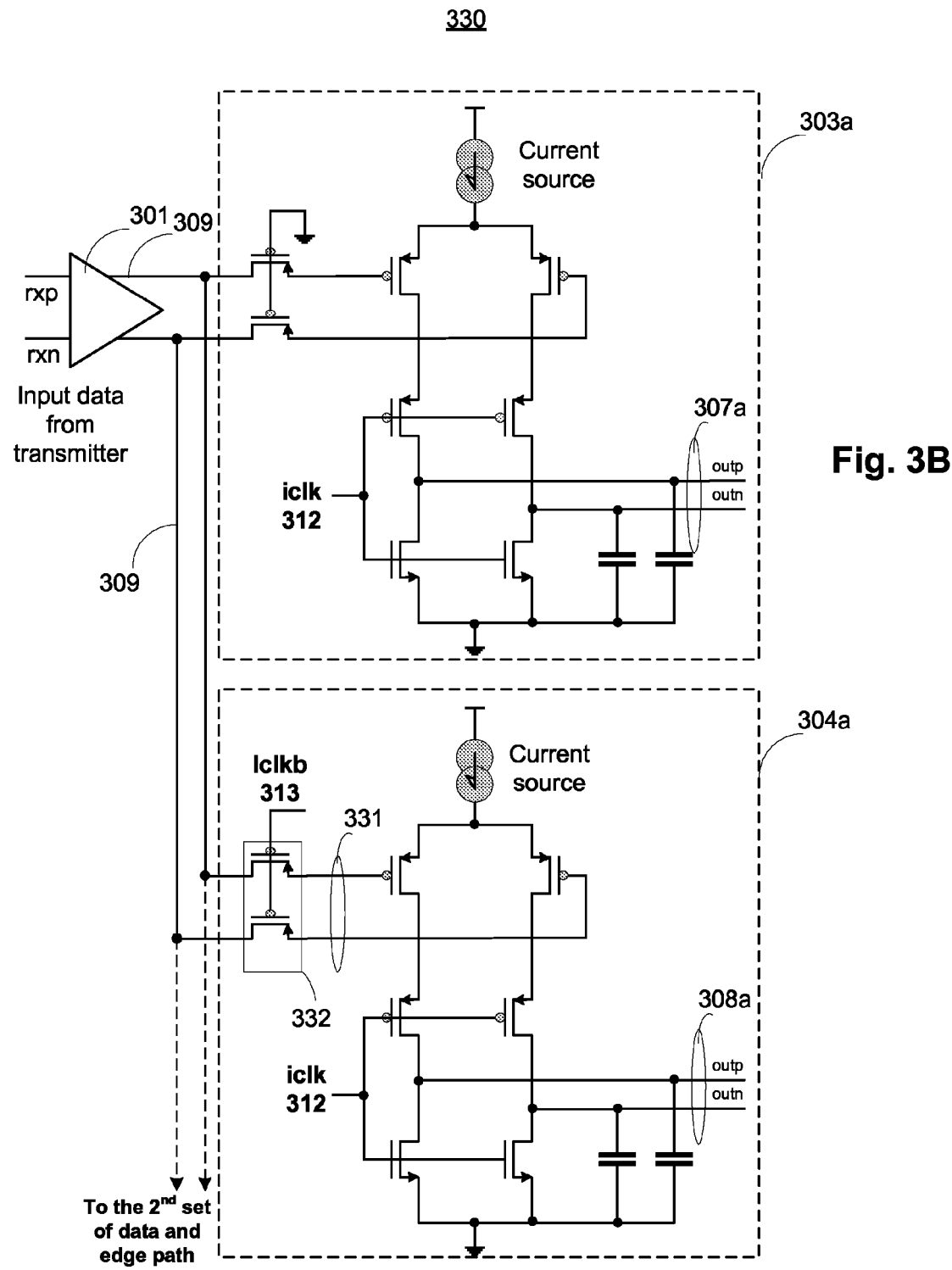
FIG. 3B is an implementation of an integrator and a corresponding matching circuit for use in the receiver of FIG. 1 and FIG. 3A, according to one embodiment of the invention.

FIG. 3B is a transistor level circuit 330 of an integrator 303a and a corresponding matching circuit 304a for use in the receiver of FIG. 1 and FIG. 3A, according to one embodiment of the invention. One purpose of the matching circuit 304a is to minimize (reduce) affects of on-die process variations in the integrator 303a. In one embodiment, matching integrator 304a is used prior to sampling the first and second edges of the data signal 309, where the matching integrator 304a is operable to match a delay of the integrators 303a. The integrator 303a of FIG. 3B performs the process of integrating the input data signal 309 when iclk 312 is at logical low level, where the output of the integrator 303a is sampled by sampler 305a at a rising edge of the iclk 312.

While the integrator 303a of FIG. 3B is a differential input integrator, it can be replaced with a single ended input integrator operable to output a differential or single-ended integrated signal without changing the essence of the embodiments of the invention Likewise, the PMOS input based integrator 303a of FIG. 3B can be replaced with NMOS input based integrator without changing the essence of the embodiments of the invention.

In one embodiment, the matching integrator 304a is operable to sample the input data signal 309 at a rising edge of iclkb 313, which is the falling edge of iclk 312. In one embodiment, the data signal 309 is sampled by one or more transistors 332 to generate sampled signal 331. In one embodiment, the sampled signal 331 is integrated when iclk 312 is at logical low level, where the output of the integrator 304a is sampled by sampler 306a. Because the polarity of a sampled signal 331 is the same as the polarity of the integrated signal 308a, the effect of the matching integrator 304a is to allow the sampler 306a to instantaneously sample the data signal 309 to generate the edge sample e0 308c by means of sampler 306a. In one embodiment, the matching integrator 304a matches the delay and characteristics of the integrator 303a by having a circuit topology which is identical to the circuit topology of the integrator 303a.

FIG. 4A is a timing diagram 400 of the receiver 300 of FIG. 3A, according to one embodiment of the invention. The y-axis represents voltage while the x-axis represents time. The shaded area of the data signal 309 represents a first phase of the data signal 309 which is integrated by the integrator 303a. In one embodiment, the first phase of the data signal 309 is equal to duration to either a low or high phase of the clock signal iclk 312. The clock signal iclk 312 samples the data signal 309 at the rising edge of iclk 312 as shown by $a_k$ to generate the data sample 307c. The same rising edge of the clock signal iclk 312 samples the non-integrated data signal 309, as shown by $e_k$, to generate the edge sample 308c.

The rising edge of iclkb 313 (which is the falling edge of iclk 312) is used to sample an integrated second phase of the data signal 309, as shown by $a_{k+1}$, to generate the data sample 307d. The same rising edge of iclkb 313 is used to sample the data signal, as shown by $e_{k+1}$, to generate the edge sample 308d. In one embodiment, the second phase of the data signal 309 is equal to duration of either a low or high phase of the inverse of the clock signal iclkb 313. While the embodiments of the invention as described in terms of sampling the data signal 309 by means of the rising edge of iclk 312 and iclkb 313, other sampling alternatives are apparent to those of ordinary skill in the art in light of the foregoing description. For example, rising edge of iclk 312 and falling edge of iclk 312 may be used to generate signals 307c-d and 308c-d.

Figure 5:
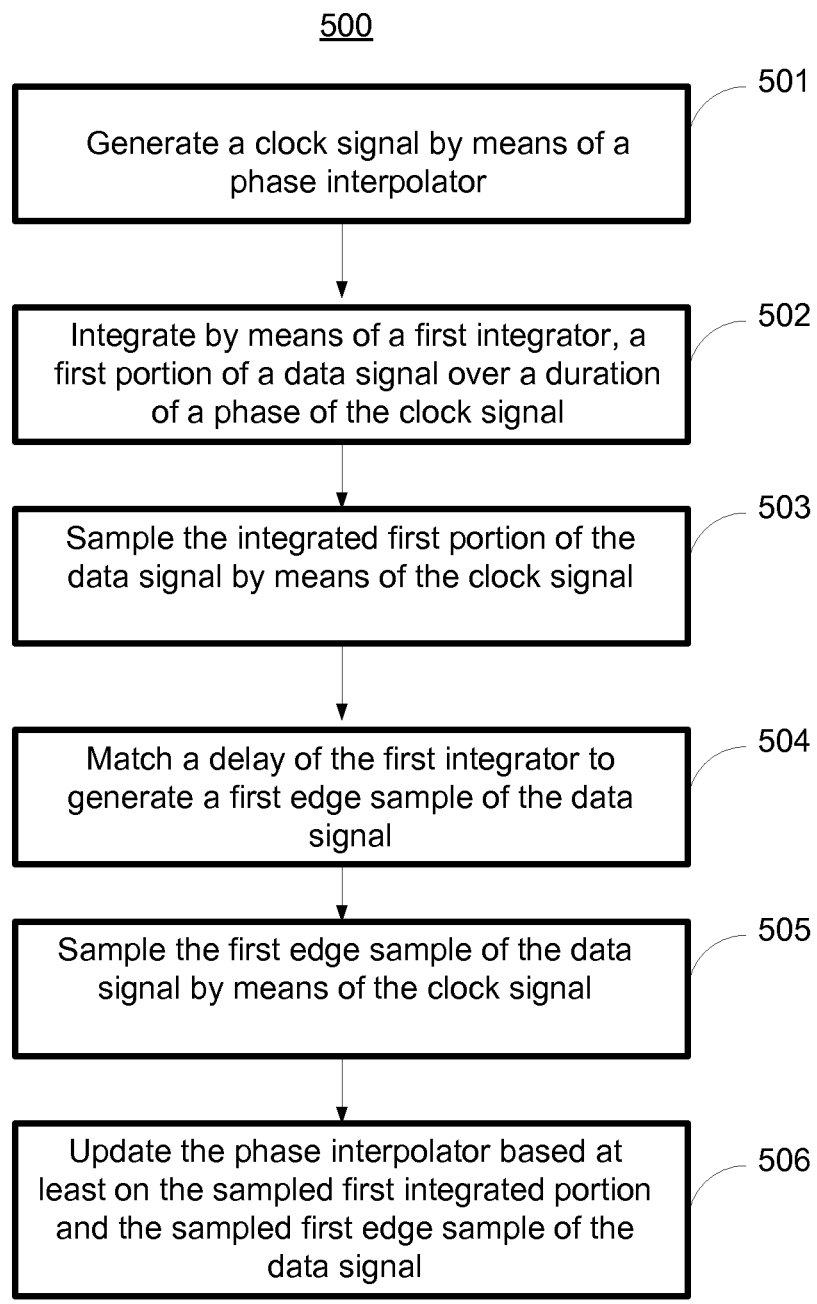
FIG. 5 is a method flowchart to recover data in a receiver, according to one embodiment of the invention.

FIG. 5 is a method flowchart 500 to generate data and clock signals from the received data signal 107 of FIG. 1, according to one embodiment of the invention. The method 500 is discussed with reference to FIG. 1 and FIG. 3A and FIG. 4A. At block 501, clock signals iclk 312 and iclkb 313 are generated by means of the phase interpolator 302. At block 502, the first integrator 303a integrates a first portion of a data signal 309 over duration of a phase of the clock signal iclk 312. At block 503, the integrated first portion d0 307c of the data signal 309 is sampled by means of the clock signal iclk 312. At block 504, a delay of the first integrator 303a is matched by matching circuit 304a to generate a first edge sample 308a of the data signal 309. At block 505, the first edge sample e0 308c of the data signal 309 is sampled by means of the clock signal iclk 312. At block 506, the phase interpolator 302 is updated based at least on the sampled first integrated portion 307c and the sampled first edge sample 308c of the data signal 309, wherein sampling the first integrated portion 307c and the first edge sample 308c of the data signal 309 is performed by means of a same transitioning edge of the clock signal iclk 312. In one embodiment, the method of FIG. 5 is implemented by executing computer executable instructions stored on a storage medium (e.g., a flash drive).

FIG. 6 illustrates a system level diagram having the receiver 104 of FIG. 1 and FIG. 3A, according to one embodiment of the invention. In one embodiment, the system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, the system 600 implements the methods disclosed herein and may be a system on a chip (SOC) system.

In one embodiment, the processor 610 has one or more processing cores 612 and 612N, where 612N represents the Nth processor core inside the processor 610 where N is a positive integer. In one embodiment, the system 600 includes multiple processors including 610 and 605, where processor 605 has logic similar or identical to logic of processor 610. In one embodiment, the processing core 612 includes, but is not limited to, pre-fetch logic to fetch instructions, decode logic to decode the instructions, execution logic to execute instructions and the like. In one embodiment, the processor 610 has a cache memory 616 to cache instructions and/or data of the system 600. In one embodiment, the cache stores the instructions to execute the methods of FIG. 5. In another embodiment of the invention, the cache memory 616 includes level one, level two and level three, cache memory, or any other configuration of the cache memory within the processor 610.

In one embodiment, processor 610 includes a memory control hub (MCH) 614, which is operable to perform functions that enable the processor 610 to access and communicate with a memory 630 that includes a volatile memory 632 and/or a non-volatile memory 634. In one embodiment, the processor 610 includes a receiver 104 of FIG. 1 and FIG. 3A. In one embodiment, the processor 610 uses the receiver 104 of FIG. 1 to communicate with the memory 630 and a chipset 620. In one embodiment, the processor 610 is also coupled to a wireless antenna 678 to communicate with any device configured to transmit and/or receive wireless signals.

In one embodiment, the volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 634 includes, but is not limited to, flash memory, phase change memory (PCM), read-only memory (ROM), electrically erasable programmable read-only memory (EEPROM), or any other type of non-volatile memory device.

The memory 630 stores information and instructions to be executed by the processor 610. In one embodiment, memory 630 may also store temporary variables or other intermediate information while the processor 610 is executing instructions. In one embodiment, chipset 620 connects with processor 610 via Point-to-Point (PtP or P-P) interfaces 617 and 622. In one embodiment, chipset 620 enables processor 610 to connect to other modules in the system 600. In one embodiment of the invention, interfaces 617 and 622 operate in accordance with a PtP communication protocol such as the Intel® QuickPath Interconnect (QPI) or the like.

In one embodiment, the processor 610 includes a receiver 104 of FIG. 1 and FIG. 3A. In one embodiment, the chipset 620 uses the receiver 104 of FIG. 1 and FIG. 3A to communicate with the processor 610, 605N, display device 640, and other devices 672, 676, 674, 660, 662, 664, 666, 677, etc. In one embodiment, the chipset 620 is also coupled to a wireless antenna 678 to communicate with any device configured to transmit and/or receive wireless signals.

In one embodiment, chip set 620 connects to a display device 640 via an interface 626. In one embodiment, the display 640 includes, but is not limited to, liquid crystal display (LCD), plasma, cathode ray tube (CRT) display, or any other form of visual display device. In one embodiment of the invention, processor 610 and chipset 620 are merged into a single SOC. In addition, the chipset 620 connects to one or more buses 650 and 655 that interconnect various modules 674, 660, 662, 664, and 666. In one embodiment, buses 650 and 655 may be interconnected together via a bus bridge 672 if there is a mismatch in bus speed or communication protocol. In one embodiment, chipset 620 couples with, but is not limited to, a non-volatile memory 660, a mass storage device (s) 662, a keyboard/mouse 664, and a network interface 666 via interface 624 and/or 104, smart TV 676, consumer electronics 677, etc.

In one embodiment, the mass storage device 662 includes, but is not limited to, a solid state drive, a hard disk drive, a universal serial bus flash memory drive, or any other form of computer data storage medium. In one embodiment, network interface 666 is implemented by any type of well known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although the cache memory 616 is depicted as a separate block within the processor 610, the cache memory 616 can be incorporated into the processor core 612 respectively. In one embodiment, the system 600 may include more than one processor/processing core in another embodiment of the invention.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. For example, in one embodiment the integrator and corresponding matching circuit of FIG. 3B can be implemented as single ended circuits operable to receive a differential or single ended input and operable to generate a single ended output. In one embodiment, the integrator and corresponding matching circuit of FIG. 3B can implemented as NMOS differential input based integrator and corresponding matching circuit instead of the PMOS based implementation of FIG. 3B.

FIG. 4B is a timing diagram 410 of an alternative receiver, according to one embodiment of the invention. In such an alternative embodiment, the recovered clock signals, iclk 312 and iclkb 313 of FIG. 3A, are aligned to the middle of the eye of the data signal 309 to instantaneously sample the data signal 309 to generate the sampled signals d0 307c and d1 307d. In one embodiment, the integrators 303a and 303b of FIG. 3A are swapped with the matching circuits 304a and 304b of FIG. 3A. In such an embodiment, the same recovered clock signals, iclk 312 and iclkb 313 of FIG. 3A, are used to sample edges of the data signal 309 by sampling the integrated output of the integrators 303a and 303b (which were previously matching circuits 304a and 304b). Like, FIG. 4A, the embodiment that results in the timing diagram 410 of FIG. 4B, the same clock transition edge is used to sample both the data and edge of the data signal 309.

The embodiments of the invention are intended to embrace all such alternatives, modifications, and variations as to fall within the broad scope of the appended claims.

We claim:

1. An apparatus comprising:
a phase interpolator to generate a clock signal;
a first integrator to integrate a first portion of a data signal over a duration of a phase of the clock signal;
a first sampler to sample the first integrated portion by means of the clock signal;
a first circuit to store a first edge sample of the data signal;
a second sampler to sample the stored first edge sample by means of the clock signal; and
a clock data recovery unit to update the phase interpolator based at least on the sampled first integrated portion and sampled stored first edge sample of the data signal.

2. The apparatus of claim 1, wherein the phase interpolator is a single phase interpolator and is further operable to generate an inverse of the clock signal.

3. The apparatus of claim 1, wherein the first and second samplers are operable to sample the first integrated portion and the stored first edge sample of the data signal by means of a same transitioning edge of the clock signal.

4. The apparatus of claim 1, wherein the duration of the phase of the clock signal is equal to duration of either a low or high phase of the clock signal.

5. The apparatus of claim 2 further comprising:
a second integrator to integrate a second portion of the data signal over a duration of a phase of the inverse of the clock signal;
a third sampler to sample the second integrated portion by means of the inverse of the clock signal;
a second circuit to store a second edge sample of the data signal; and
a fourth sampler to sample the stored second edge sample by means of the inverse of the clock signal,
wherein the clock data recovery unit is further operable to update the phase interpolator based on the sampled second integrated portion and sampled stored second edge sample of the data signal.

6. The apparatus of claim 5, wherein the duration of the phase of the inverse of clock signal is equal to duration of either a low or high phase of the inverse of the clock signal.

7. The apparatus of claim 5, wherein the first and second circuits are operable to match a delay of the first and second integrators respectively.

8. The apparatus of claim 5, wherein the third and fourth samplers are operable to sample the second integrated portion and the stored second edge sample of the data signal by means of a same transitioning edge of the inverse of the clock signal.

9. The apparatus of claim 5, wherein the clock data recovery unit is operable to update the phase interpolator by means of an update signal generated by the clock data recovery unit, and wherein the update signal represents a timing relationship between the sampled first and second integrated portions of the data signal and the sampled first and second edge samples of the data signal.

10. The apparatus of claim 9, wherein the phase interpolator is operable to receive the update signal and modify a delay of the clock signal and the inverse of the clock signal.

11. The apparatus of claim 1, wherein the phase interpolator is operable to receive quadrature clock signals and output only the clock signal and an inverse of the clock signal, and wherein the clock signal and an inverse of the clock signal are generated from the quadrature clock signals.

12. A system comprising:
a memory; and
a processor, coupled to the memory, comprising a receiver to receive a signal over a transmission medium and to generate a data signal from the received signal, the receiver comprising:
a phase interpolator to generate a clock signal;
a first integrator to integrate a first portion of the data signal over a duration of a phase of the clock signal;
a first sampler to sample the first integrated portion of the data signal by means of the clock signal;
a first circuit to store a first edge sample of the data signal;
a second sampler to sample the stored first edge sample by means of the clock signal; and
a clock data recovery unit to update the phase interpolator based at least on the sampled first integrated portion and sampled stored first edge sample of the data signal.

13. The system of claim 12, wherein the phase interpolator is a single phase interpolator and is further operable to generate an inverse of the clock signal.

14. The system of claim 12, wherein the first and second samplers are operable to sample the first integrated portion and the stored first edge sample of the data signal by means of a same transitioning edge of the clock signal.

15. The system of claim 12, wherein the duration of the phase of the clock signal is equal to duration of either a low or high phase of the clock signal.

16. The system of claim 13 further comprising:
a second integrator to integrate a second portion of the data signal over a duration of a phase of the inverse of the clock signal;
a third sampler to sample the second integrated portion of the data signal by means of the inverse of the clock signal;
a second circuit to store a second edge sample of the data signal; and
a fourth sampler to sample the stored second edge sample by means of the inverse of the clock signal,
wherein the clock data recovery unit is further operable to update the phase interpolator based on the sampled second integrated portion and the sampled stored second edge sample of the data signal.

17. The system of claim 16, wherein the first and second circuits are operable to match a delay of the first and second integrators respectively.

18. The system of claim 16, wherein the third and fourth samplers are operable to sample the second integrated portion and the stored second edge sample of the data signal by means of a same transitioning edge of the inverse of the clock signal.

19. A method comprising:
   generating a clock signal by means of a phase interpolator;
   integrating, by means of a first integrator, a first portion of a data signal over a duration of a phase of the clock signal;
   sampling the integrated first portion of the data signal by means of the clock signal;
   matching a delay of the first integrator to generate a first edge sample of the data signal;
   sampling the first edge sample of the data signal by means of the clock signal; and
   updating the phase interpolator based at least on the sampled first integrated portion and the sampled first edge sample of the data signal.

20. The method of claim 19, wherein the phase interpolator is a single phase interpolator, and wherein sampling the first integrated portion and the first edge sample of the data signal is performed by means of a same transitioning edge of the clock signal.

* * * * *